Jan. 3, 1967   A. S. TAVENOR ETAL   3,296,061
RUBBER LAMINATES
Filed Dec. 27, 1962
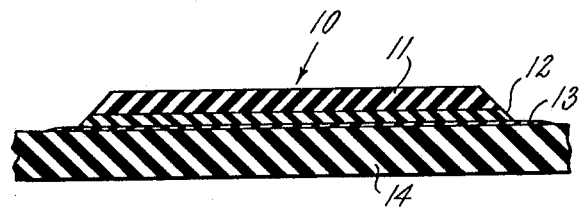
INVENTORS
ALBERT S. TAVENOR
JAMES B. BORLAND
BY Willard R Sprowls
ATTORNEY 3,296,061
RUBBER LAMINATES
Albert S. Tavenor and James B. Borland, Indianapolis, Ind., assignors to United States Rubber Company, New York, N.Y., a corporation of New Jersey
Filed Dec. 27, 1962, Ser. No. 247,608
8 Claims. (Cl. 161—240)

This invention relates to rubber vehicle tires and more particularly to rubber identifying labels adhered to the sidewalls of said tires.

It has heretofore been a practice to provide an identifying emblem or label for unbranded or "neutral" tires which could be applied to the sidewall surface of the cured tires so that the label would permanently adhere thereto, particularly under the action of dynamic flexing, abrasion, weather exposure, strains and stresses that are encountered in normal tire service. "Neutral" tires are those tires that are manufactured with no brand name thereon and which are subsequently labelled as orders for various brands, trade names, and the like come in from different customers.

The label customarily used in the tire industry, is a laminate consisting of a front layer of cured or vulcanized rubber bearing the particular brand or indicia desired, and a backing layer of uncured or partially cured (unvulcanized or partially vulcanized) rubber. The retention of essentially uncured properties in the backing layer is conducive to improved adhesive bonding to foreign surfaces. The label is made to adhere to the tire with the aid of a rubber cement containing migratory curing ingredients which cause the backing layer to become vulcanized onto the tire. It is essential, therefore, that the backing layer of the label be maintained in an uncured or partially cured condition up to the time of contact with the cement.

Heretofore, it has been very difficult to prepare a commercially suitable label because of the tendency of curatives in the cured front layer to migrate into the backing layer, thus resulting in a premature cure of the backing layer and thereby interfering with subsequent adhesion to the tire.

It is an object of the present invention to overcome the foregoing difficulty and to provide an improved rubber label that can be firmly attached to the sidewall of a vulcanized natural or synthetic rubber tire.

Another object is to provide such a label capable of being applied simply by cementing same to a tire with no further heating or pressure, other than that generated in normal tire operation.

A further object is to provide such a label with a level of adhesion such that the label does not separate from the tire by virtue of the conditions, strains and stresses encountered in normal tire service.

Other objects of the invention will appear in the following description and in the appended claims.

In the accompanying drawing:

The figure is a transverse section of a rubber tire for vehicles and a rubber label adhered thereto.

According to the present invention, rubber tire labels having very strong adhesive qualities are prepared, said labels comprising a two-ply laminate consisting of a completely vulcanized front layer 11 of peroxide-cured rubber, having an ornamental or descriptive marking 10 (for the tire 14), and a backing layer 12 of partially cured rubber having hydrated aluminum silicate incorporated therein and compounded for vulcanization with a sulfur curative.

In addition to a sulfur curative, conventional sulfur-cure accelerators may also be compounded into the backing layer. However, the amount of sulfur curative and accelerators in the backing layer must be such that no appreciable cross linkage or vulcanization of the rubber therein results from the heat exposure that occurs during the normal curing cycle of the front layer. The sulfur curative and accelerators in the backing layer are present in amounts sufficient to effect a satisfactory vulcanization reaction at such later time as is desired by the interaction of these curing agents and a migrating ultra-accelerator which may be incorporated into the system at such later time by means of a rubber cement 13, of the type mentioned in U.S. 2,625,980 (column 5). For the purpose of this invention, we have found that from 0.25 to about 0.75 part by weight of sulfur curative per 100 parts of rubber in the backing layer is sufficient to achieve the above purpose. Specific examples of sulfur-curable rubbers are natural rubber, butyl rubber, styrene-butadiene rubber (SBR), ethylene-propylene-diene rubber (EPRD, in which the diene may be, for example, dicyclopentadiene or 1,4-hexadiene), polychloroprene, polyisoprene, and polybutadiene.

The ultra-accelerator may be any migratory ingredient— that is, any rubber-soluble ingredient, be it an accelerator, activator, or the like—capable of diffusing into the volume behind the surface to which it is applied and, in conjunction with other ingredients already compounded into the volume, vulcanizing (curing) the volume. Depending, of course, on the conditions under which the ultra-accelerator is expected to operate—e.g., time, temperature, type, and compounded ingredients of the unvulcanized rubber; the ultra-accelerator may be selected from any of the known and compatible ultra-accelerators. Such ultra-accelerators may be those specified in U.S. 2,625,980, the carbon disulfide accelerators disclosed in "Chemistry and Technology of Rubber" by Davis and Blake (pp. 302–303) together with sufficient conventional volatile rubber solvent (e.g., hydrocarbons, chlorinated hydrocarbons, ethers, ketones, etc., such as carbon tetrachloride, heptane, toluene, carbon disulfide, ether, chloroform, benzene, or any of the solvents mentioned in the Davis and Blake book, supra, pp. 201–202) to allow penetration of the rubber by the ultra-accelerator, aldehyde-amine condensation products ("Beutene"), dibutylammoniumoleate ("Barak"), morpholine (2,3,5,6-tetrahydro-1,4-oxazine), and the like. Typical of such ultra-accelerators are the thiuram sulfides, including the mono-, di-, and poly-sulfides, and the dithiocarbamates (among which may be mentioned, by way of nonlimiting example, tetramethylthiuram monosulfide, tetramethylthiuram disulfide, dipentamethylenethiuram pentasulfide, zinc dimethyldithiocarbamate, sodium dibutyldithiocarbamate, piperidinium pentamethylenedithiocarbamate, etc.).

Should the front layer of the label be also compounded for sulphur vulcanization, the migration of the sulfur curative from the front layer into the backing layer results in a premature curing of the latter. To avoid this, it has heretofore been the practice, in the manufacture of conventional labels, to incorporate materials into the backing layer which are antagonistic to sulfur vulcanization, as for example, sodium bisulfite, White Rubber Substitute [1], inorganic acids such as hydrochloric, sulfuric or phosphoric acids, organic acids such as salicylic or acetic acids, and acid salts of alkaline earth metals. These materials prevent cross-linking of the backing layer during the curing cycle of the front layer and during subsequent storage due to any sulfur migration from the front layer. However, the presence of these materials may also interfere with the subsequent sulfur vulcanization of the backing layer when the labels are caused to adhere to tires by means of rubber cement containing ultra-accelerators

[1] A vulcanized vegetable oil, marketed by Carter Bell Mfg. Co.

which migrate from the rubber cement into the backing layer.

It has now been discovered that, by utilizing organic peroxide curatives instead of sulfur curatives in the front layer, and by incorporating hydrated aluminum silicate into the backing layer, the foregoing difficulty is eliminated. The use of organic peroxides as rubber vulcanizing agents is well known in the art, e.g., see "Chemistry of Natural and Synthetic Rubbers," by H. C. Fisher, Reinhold Publ. Corp., 1957, pages 28–29. Peroxide curatives have been found applicable to the vulcanization of such rubbers as natural rubber, butadiene-styrene copolymer rubbers, butadiene-acrylonitrile copolymer rubbers, ethylene-propylyene rubbers and polychloroprene rubbers. Among the suitable organic peroxides operable herein are dicumyl peroxide, benzoyl peroxide, di-t-butyl peroxide, 1-butyl peroxybenzoate and 2,2-(t-butylperoxy) butane.

The presence of hydrated aluminum silicate in the backing layer effectively prevents premature curing of said layer due to migration of the peroxide curative from the front layer, without destroying the capacity of the backing layer to undergo vulcanization when later placed in contact with a rubber cement containing ultra-accelerators capable of migrating into the backing layer. It is believed that the hydrated aluminum silicate partially decomposes the migratory peroxides, thereby destroying their ability to induce further cross-linking.

The amount of hydrated aluminum silicate that may be incorporated into the backing layer is from about 2 to about 120 parts by weight, based on one hundred parts of rubber, although from about 5 to about 80 parts is the preferred range. In practice, the amount of hydrated aluminum silicate incorporated into the backing layer will depend on the amount of peroxide curative used in the front layer, there being no necessity for using excess hydrated aluminum silicate beyond the amount sufficient to counteract the effect of any migratory peroxides.

The following examples will illustrate the invention in more detail.

*Example 1*

Formulation No. 1 illustrates a rubber composition having a peroxide curavtive incorporated therein and suitable for vulcanization as a front layer of a tire label. Formulation No. 2 illustrates a rubber composition suitable as a backing layer and having a sulfur curative and hydrated aluminum silicate incorporated therein. All parts are by weight.

Formulation No. 1—Front layer: Parts by wt.
    Natural rubber (No. 1 smoked sheets) _____ 50.00
    SBR rubber[1] _____ 50.00
    Antioxidant[2] _____ 1.00
    High abrasion furnace carbon black _____ 30.00
    Magnesium oxide _____ 10.00
    Dicumyl peroxide _____ 1.50
    Triethanolamine _____ 2.00

Formulation No. 2—Backing layer:
    Natural rubber (No. 1 smoked sheets) _____ 100.00
    Zinc oxide _____ 10.00
    Antioxidant (the same as in Formulation No. 1) _____ 1.00
    Hydrated aluminum silicate _____ 40.00
    Fast extrusion furnace carbon black _____ 3.00
    Stearic acid _____ 3.00
    Mercaptobenzothiazole (accelerator) _____ .25
    Diphenyl guanidine (accelerator) _____ .10
    Sulfur _____ .50

[1] Styrene-butadiene copolymer having a styrene content of 22.5% by weight, based on the total weight of copolymer.
[2] A liquid high temperature reacion product of diphenyl amine and acetone, manufactured by the Naugatuck Chemical Co.

The front layer (Formulation No. 1) and the backing layer (Formulation No. 2) were mixed separately on roll mills, calendered into sheets having a thickness of 0.045 inch and 0.020 inch respectively, laminated together and cured for 8 minutes at 320° F. This suffices to effect a high state of vulcanization in the front layer. The backing layer, however, remains in essentially an uncured or semi-cured condition as evidenced by a retention of surface tack and an ability to adhere to itself. The uncured surface of the backing layer may be protected from exposure to the atmosphere during storage by a suitable protective film shuch as aluminum foil, polyethylene, Mylar[3] polyester film, and the like. When ready for application to the tire sidewall, the protective film is simply stripped off and the uncured backing layer of the label is placed in juxtaposition with the sidewall of a rubber vehicle tire which has previously been coated with a thin layer of rubber cement (see Example 3). To further assist adhesion, the label may be lightly stitched to the tire, as with a hand type roller.

The following compositions, which are illustrative of those formulations used in making conventional tire labels, were prepared for comparative purposes.

A vulcanized vegetable oil (White Rubber Substitute marketed by Carter Bell Mfg. Co.) which is antagonistic to sulfur curative systems, was incorporated into the backing layer to counteract the effect, upon standing, of migratory sulfur from the cured front layer. All parts are by weight.

Formulation No. 3—Front layer: Parts by wt.
    Natural Rubber (No. 1 smoked sheets) ____ 50.00
    SBR rubber[4] _____ 50.00
    High abrasion furnace carbon black _____ 15.00
    Zinc oxide _____ 10.00
    Zinc laurate _____ 1.00
    Antioxidant[4] _____ 1.50
    6 - Ethoxy - 2,2 - rihydro-2,3,4-trimethylquinoline _____ 2.00
    Medium process oil[5] _____ 1.00
    Mercaptobenzothiazole (accelerator) _____ 1.00
    Sulfur _____ 2.00

Formulation No. 4—Backing layer:
    Natural Rubber (No. 1 smoked sheets) ____ 100.00
    Semi-reinforcing carbon black _____ 12.00
    Medium process oil (the same as in Formulation No. 3) _____ 6.00
    Whiting (98% $CaCO_3$) _____ 72.00
    p-Aminophenol (antioxidant) _____ 0.25
    White Rubber Substitute (vulcanized vegetable oil) _____ 32.00
    Sulfur _____ 10.00

[4] The same as in Formulation No. 1.
[5] A petroleum hydrocarbon oil, e.g., #8 of Standard Oil Co. of California.

A tire label was prepared from the above compositions according to the procedure described in Example 1.

*Example 3*

The following formulation for a typical rubber cement containing an ultra-accelerator was prepared. All parts are by weight.

Formulation No. 5—Cement: Parts by wt.
    Natural Rubber (No. 1 smoked sheets) ___ 100.00
    Semi-reinforcing carbon black _____ 50.00
    Zinc oxide _____ 5.00
    Butyl Eight[6] (ultra-accelerator) _____ 20.00
    Naphtha _____ 2635.00
    Isopropanol _____ 150.00

[6] An activated dithiocarbamate type of rubber ultra-accelerator marketed by the R. T. Vanderbilt Co., which is a reddish brown liquid having a specific gravity of 1.01±.02 and a flash point of 107° F.

The unbuffed sidewall of a 1.10–15 automobile tire was coated with a thin layer of the above cement. The side-

[3] Trademark for film of polyethylene terephthalate resin marketed by E. I. du Pont de Nemours & Co.

wall of another 7.10–15 tire was lightly abraded with a buffing wheel and then similarly coated with the cement.

When the cement had dried, labels that had been prepared according to Examples 1 and 2 were adhered to each tire, the backing layer of the labels being placed in contact with the cement. The assemblies were exposed to air (air cured) for 17 hours at room temperature (78°–81° F.).

Each tire, at 28 pounds per square inch inflation, was then operated on a smooth test wheel at 50 m.p.h. under a load of 1140 lbs. The degree of separation was visually estimated and a ruler was used to measure the percentage of the total area of the label not separated or broken loose from the tire.

(A) Adhesion to an unbuffed tire sidewall:

The conventional label (Example 2) showed edge separation initiated after 30 minutes and complete separation from the tire after 2.5 hours.

The label of this invention (Example 1) showed very slight edge separation after 3.5 hours. The test was discontinued after 173 hours with the label 98% adhered.

(B) Adhesion to a buffed sidewall:

The conventional label (Example 2) showed edge separation initiated after 30 minutes and complete separation from the tire after 1.6 hours.

The label of this invention (Example 1) showed very slight edge separation after 5 hours. The test was discontinued after 173 hours with the label 98% adhered.

*Example 4*

In the manner described in Example 3, the sidewall of a 7.10–15 passenger tire was lightly buffed, coated with cement and labeled. This experiment was conducted to establish whether the labels of this invention would adhere if placed in service after a short air cure of 3 hours instead of the 17 hours of Example 3. Air curing time is a critical factor because adhesion improves with aging as the backing layer becomes increasingly cross-linked by the migrating ultra-accelerator. In comparison, the conventional labels were allowed to air cure for a longer period of time prior to testing, to wit 22 hours.

|  | Labels prepared according to the method of Example 1 | | | Conventional labels prepared according to Example 2 | |
|---|---|---|---|---|---|
|  | A | B | C | D | E |
| Curing Time (mins.) at 320° F | 6 | 8 | 10 | 6 | 6 |
| Air Cure Period (hrs.) | 3 | 3 | 3 | 22 | 22 |
| Separation after Smooth Wheel Test (as in Example 3) | (¹) | (¹) | (¹) | (²) | (²) |

¹ All three were 100% adhered when test was discontinued after 113 hrs.
² Both labels completely separated after 1.25 hrs.

*Example 5*

Labeled tires, prepared as in Examples 1 and 2, were allowed to air cure for 16 hours at room temperature (72° C.). Test samples from the tires, measuring 2″ wide by 6″ long with a 1.5″ by 1″ label adhered at the center of the sample, were then flexed in a DeMattia type laboratory flexing apparatus according to the method described on page 216 of the Vanderbilt Rubber Handbook, 1958, published by R. T. Vanderbilt Company, Inc. Complete separation of the conventional type of label, prepared according to Example 2, occurred after 20 minutes. In contrast, the labels of this invention, prepared according to Example 1, were still 100% adhered when the test was discontinued after 3 hours.

*Example 6*

Following the procedure outlined in Example 1, tire labels were prepared in which the backing layers were made from the formulations tabulated below. The front layers in each case were the same as in Example 1.

|  | Parts by Weight | | | |
|---|---|---|---|---|
|  | A | B | C | D |
| Natural rubber (No. 2 smoked sheets) | 100 | 100 | 100 | 100 |
| Zinc oxide | 10 | 10 | 10 | 10 |
| Hydrous aluminum silicate | 20 | 40 | 80 | 120 |
| Fast extrusion furnace carbon black | 3 | 3 | 3 | 3 |
| Stearic acid | 3 | 3 | 3 | 3 |
| Antioxidant (of Formulation No. 1) | 1 | 1 | 1 | 1 |
| Mercaptobenzothiazole | 0.25 | 0.25 | 0.25 | 0.25 |
| Diphenyl guanidine | 0.10 | 0.10 | 0.10 | 0.10 |
| Sulfur | 0.50 | 0.50 | 0.50 | 0.50 |

Sample labels, prepared from each of the above formulations together with the front layer of Example 1, were cemented to the buffed sidewall of a 7.10–15 passenger tire using the rubber cement of Example 3. The assembly was allowed to air cure for 16 hours at room temperature (78° F.). Test samples, as in Example 5, were cut from the tire and tested by the procedure of Example 5. The number of cycles required for 50% separation of each label from the tire was recorded as follows:

|  | A | B | C | D |
|---|---|---|---|---|
| No. of cycles (X 1000) for 50% separation | 330 | 330 | 195 | 92 |

The foregoing data illustrate that the preferred upper limit of the range of hydrous aluminum silicate for the purposes of this invention is about 80 parts per 100 parts of rubber, although as much as 120 parts of hydrous aluminum silicate may be used.

Example 7

Following the procedure outlined in Example 1, tire labels were prepared in which the backing layers were made from the formulations tabulated below. The front layers in each case were the same as in Example 1.

|  | 1 | 2 | 3 | 4 | *5 |
|---|---|---|---|---|---|
| Natural Rubber Smoked Sheet | 100 | 100 | 100 | 100 | 100 |
| Zinc Oxide | 10 | 10 | 10 | 10 | 10 |
| Fast Extrusion Furnace Carbon Black | 20 | 20 | 20 | 20 | 3 |
| Hydrous aluminum silicate |  | 5 | 10 | 20 | 40 |
| Stearic Acid | 3 | 3 | 3 | 3 | 3 |
| Antioxidant (of Formulation No. 1) | 1 | 1 | 1 | 1 | 1 |
| Mercaptobenzothiazole | 0.25 | 0.25 | 0.25 | 0.25 | 0.25 |
| Diphenyl guanidine | 0.10 | 0.10 | 0.10 | 0.10 | 0.10 |
| Sulfur | 0.50 | 0.50 | 0.50 | 0.50 | 0.50 |

*Backing Layer of Example 1.

Sample labels prepared from each of the above formulations together with the front layer of Example 1, were cemented to a 1 inch wide strip of buffed sidewall of a passenger tire using the rubber cement of Example 3. The assemblies were allowed to air cure for 16 hours at 73° F. The force in pounds required to separate the label from the tire segment was measured on a Scott Model X5 Tester, operating at a rate of separation of 20 inches per minute. Measurements were as follows:

|  | 1 | 2 | 3 | 4 | 5 |
|---|---|---|---|---|---|
| Pounds pull | 3.4 | 6.2 | ¹ 7.0 | ¹ 7.0 | ¹ 8.0 |

¹ Label started to tear.

The foregoing data illustrate that the lower limit of the preferred range of hydrous aluminum silicate is 5 parts per 100 parts of rubber, although as little as 2 parts may be used beneficially.

It will be understood by those skilled in the art that the present invention may be used to improve the adhesion of tire or inner tube patches, liners for tubeless tires, blowout patches, tire repair patches, or for any other purpose which may require the affixing of an external or internal reinforcing or decorative layer containing vulcanized rubber to an article having at least a surface made of vulcanizable rubber or vulcanized rubber, whether the rubber (including natural rubber or any of the synthetic rubbers previously mentioned) in such surface contains a sulfur-type vulcanizing agent or a non-sulfur curing agent, such as a peroxide, p-quinonedioxime, or the like. It will be further understood that said reinforcing or decorative layer may be reinforced with textile fibers, wire, oriented or disoriented fibers, or various combinations thereof. It will be further understood that a tubeless tire liner prepared according to the present invention (a layer of peroxide-cured rubber reinforcing an uncured butyl liner of relatively thin gauge) may be used to obtain the great advantage of preventing squeeze-out, the undesirable thinning of the butyl liner in spots during shaping and curing of the completed tire to such an extent as might interfere with the air-retention qualities of the butyl liner.

A further application of the principle of this invention is in the field of tires having butyl carcasses and ethylene-propylene rubber treads. A present difficulty in this art— viz., the partial destruction of the butyl carcass by the migratory peroxide curatives from the EPR peroxide-cured treads—can be alleviated by the preparation of a butyl carcass containing hydrated aluminum silicate which would destroy any migratory peroxide curative.

It should be understood that the precise proportions of the materials utilized may be varied and equivalent chemical materials may be employed if desired without departing from the spirit and scope of the invention as defined in the appended claims.

Having thus described our invention, what we claim and desire to protect by Letters Patent is:

1. A laminate consisting of a first layer and a second layer; said first layer comprising a peroxide-cured rubber; said second layer comprising a sulfur-curable rubber, a sulfur curative and hydrated aluminum silicate.

2. A structure, at least a portion of one surface of which consists of rubber, having the laminate of claim 1 affixed to said portion, said second layer of said laminate being in intimate contact with said portion.

3. The laminate of claim 1 having from about 2 parts to about 120 parts by weight of hydrated aluminum silicate based on 100 parts of said sulfur curable rubber in said second layer, the amount of said silicate present being sufficient to deactivate migratory peroxide curative entering said second layer from said first layer.

4. The laminate of claim 1 having from about 5 to about 80 parts by weight of hydrated aluminum silicate based on 100 parts of said sulfur-curable rubber in said second layer, the amount of said silicate present being sufficient to deactivate migratory peroxide curative entering said second layer from said first layer.

5. The laminate of claim 1 having from about 0.25 to about 0.75 part by weight of sulfur curative based on 100 parts of said sulfur-curable rubber of said second layer.

6. A laminate consisting of a first layer, a second layer, and a third layer; said first layer comprising a peroxide-cured rubber; said second layer comprising a sulfur-curable rubber, a sulfur curative, and hydrated aluminum silicate; said third layer comprising a rubber cement containing an ultra-accelerator capable of migrating into and curing said second layer.

7. A laminate consisting of a first layer and a second layer; said first layer comprising a peroxide-cured rubber; said second layer comprising a sulfur-cured rubber and a hydrated aluminum silicate.

8. A method of affixing a laminate consisting of a first layer of peroxide-cured rubber and a second layer of sulfur-curable rubber, a sulfur curative, and hydrated aluminum silicate to a structure, at least a portion of one surface of which consists of rubber, comprising the steps of (1) applying a rubber cement containing ultra-accelerators to said second layer, and (2) forcefully placing said second layer in intimate contact with said rubber portion.

No references cited.

ALEXANDER WYMAN, *Primary Examiner.*

R. A. FLORES, *Assistant Examiner.*